(12) United States Patent
Lee et al.

(10) Patent No.: US 11,978,883 B2
(45) Date of Patent: May 7, 2024

(54) ELECTRODE FOR SECONDARY BATTERY AND FABRICATION METHOD THEREOF

(71) Applicant: SK On Co., Ltd., Seoul (KR)

(72) Inventors: Jong Hyuk Lee, Daejeon (KR); Mi Ryeong Lee, Daejeon (KR); Hee Gyoung Kang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 53 days.

(21) Appl. No.: 17/551,886

(22) Filed: Dec. 15, 2021

(65) Prior Publication Data
US 2022/0190307 A1 Jun. 16, 2022

(30) Foreign Application Priority Data
Dec. 15, 2020 (KR) .................. 10-2020-0175277

(51) Int. Cl.
*H01M 4/04* (2006.01)
*H01M 4/62* (2006.01)

(52) U.S. Cl.
CPC ....... *H01M 4/0416* (2013.01); *H01M 4/0404* (2013.01); *H01M 4/621* (2013.01)

(58) Field of Classification Search
CPC .. H01M 4/0416; H01M 4/0404; H01M 4/621; H01M 10/0525; H01M 4/049; H01M 4/139
See application file for complete search history.

(56) References Cited

U.S. PATENT DOCUMENTS

| | | | |
|---|---|---|---|
| 2016/0056468 A1* | 2/2016 | Miyamoto | H01M 4/13 429/162 |
| 2020/0388854 A1* | 12/2020 | Sakamoto | H01M 4/136 |

FOREIGN PATENT DOCUMENTS

| | | |
|---|---|---|
| KR | 101249974 B1 | 4/2013 |
| KR | 1020140039011 A | 3/2014 |

* cited by examiner

*Primary Examiner* — Stewart A Fraser
(74) *Attorney, Agent, or Firm* — The Webb Law Firm

(57) ABSTRACT

Provided is a fabrication method of an electrode for a secondary battery including coating an electrode slurry containing an electrode active material and a binder on a current collector; drying the current collector on which the electrode slurry is coated to form an electrode active material layer; and surface-treating the electrode active material layer formed on the current collector to remove a binder layer on a surface of the electrode active material layer.

8 Claims, 5 Drawing Sheets

CMC

SBR

Anode Active Material

Current collector

CMC

SBR

Anode Active Material

Current collector

FIG. 3A
FIG. 3B
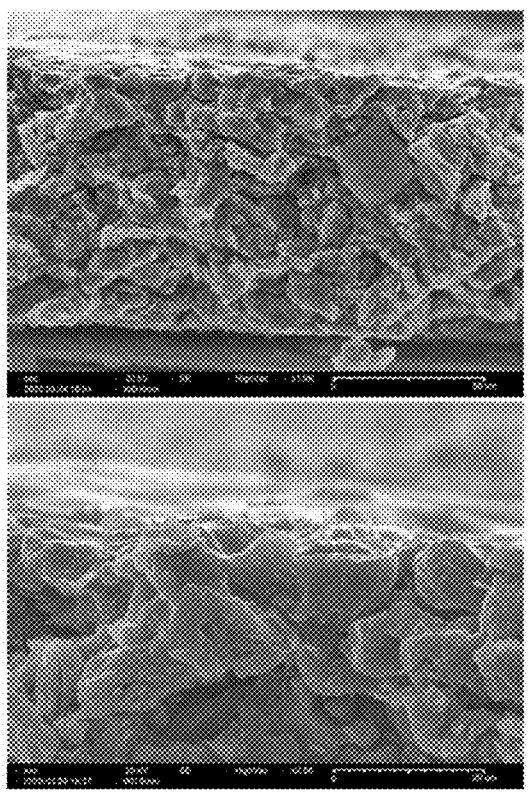
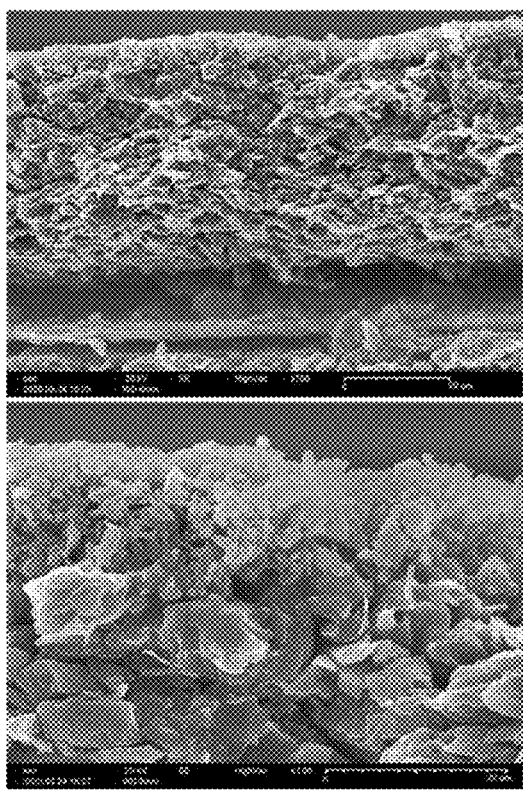

ELECTRODE FOR SECONDARY BATTERY AND FABRICATION METHOD THEREOF

CROSS-REFERENCE TO RELATED APPLICATION

This application claims priority to Korean Patent Application No. 10-2020-0175277 filed Dec. 15, 2020, the disclosure of which is hereby incorporated by reference in its entirety.

BACKGROUND OF THE INVENTION

Field of the Invention

The following disclosure relates to an electrode for a secondary battery and a fabrication method thereof.

Description of Related Art

Recently, in accordance with an increase in the demand for electronic devices such as mobile devices, development of technologies for weight reduction and miniaturization of electrochemical batteries (secondary batteries) for increasing portability of the electronic devices has been expanded. In addition to such a trend, in accordance with a global trend toward tightening regulations on fuel efficiency and exhaust gas of automobiles, the growth of an electric vehicle (EV) market has been accelerated, such that the development of high-output and large-capacity batteries to be used in such electric vehicles has been demanded.

Generally, an electrode for a lithium secondary battery is fabricated by coating and drying an electrode slurry prepared by mixing and dispersing an electrode active material, a conductive agent, and a binder in a solvent on a current collector. However, in a process of drying the electrode slurry, the binder in the slurry is exposed to a surface of the electrode to form a binder layer on the surface of the electrode, such that a problem that a resistance of the electrode is increased occurs. That is, the binder that should play a binding role in the electrode is exposed on the surface of the electrode, such that a problem that the resistance of the electrode is increased occurs. Such a problem may deteriorate quick charging performance of the secondary battery and cause the formation of lithium dendrite, which eventually deteriorates lifespan characteristics of the secondary battery.

Therefore, research and development for a technology for securing an excellent adhesion of an electrode active material layer to a current collector and suppressing a resistance increase by allowing the binder to be uniformly distributed only inside the electrode and allowing the binder not to be attached to the surface of the electrode have been required in a process of fabricating the electrode have been required.

SUMMARY OF THE INVENTION

An embodiment of the present invention is directed to solve a problem caused by a binder attached to a surface of an electrode active material layer, that is, deterioration of performance and lifespan characteristics under a quick charging condition due to a resistance increase, in a process of forming the electrode active material layer by coating and drying an electrode slurry on a current collector.

In one general aspect, a fabrication method of an electrode for a secondary battery includes: (a) coating an electrode slurry containing an electrode active material and a binder on a current collector; (b) drying the current collector on which the electrode slurry is coated to form an electrode active material layer; and (c) surface-treating the electrode active material layer formed on the current collector to remove a binder layer on a surface of the electrode active material layer.

The surface treatment may be dry surface treatment.

The surface treatment may be performed by ultraviolet (UV)-ozone treatment.

The UV-ozone treatment may be performed for 5 minutes to 60 minutes.

A thickness of the binder layer may be 1 to 50 nm.

A content of the binder in the electrode active material layer after the surface treatment of the step (c) may be 97 wt % or more of a content of the binder before the surface treatment.

An adhesion of the electrode active material layer to the current collector may be 0.2 N/cm or more.

In another general aspect, an electrode for a secondary battery includes: a current collector; and an electrode active material layer positioned on at least one surface of the current collector and containing an electrode active material and a binder, wherein a content of the binder in a surface portion of the electrode active material layer is 0 to 1 wt % based on a total content of the binder in the electrode active material layer.

A total content of the binder in the electrode active material layer with respect to a total weight of the electrode active material layer may be 1 to 10 wt %.

In still another aspect, a secondary battery includes: the electrode according to an embodiment of the present invention; a separator; and an electrolyte.

BRIEF DESCRIPTION OF THE DRAWINGS

FIGS. 1A to 1C are views illustrating electrode structures for a secondary battery before and after surface treatment according to an embodiment of the present invention, wherein FIG. 1A is a view illustrating an electrode structure before surface treatment, FIG. 1B is a view illustrating a surface treatment process according to an embodiment of the present invention, and FIG. 1C is a view illustrating an electrode structure after the surface treatment.

FIGS. 2A and 2B are views illustrating images of surfaces of negative electrodes fabricated according to Examples and Comparative Example, captured by a scanning electron microscope, wherein FIG. 2A is an image of the negative electrode according to Example, and FIG. 2B is an image of the negative electrode according to Comparative Example.

FIGS. 3A and 3B are views illustrating images of cross sections of the negative electrodes fabricated according to Examples and Comparative Example, captured by a scanning electron microscope, wherein FIG. 3A is an image of the negative electrode according to Example, and FIG. 3B is an image of the negative electrode according to Comparative Example.

DESCRIPTION OF THE INVENTION

Figure 1A:
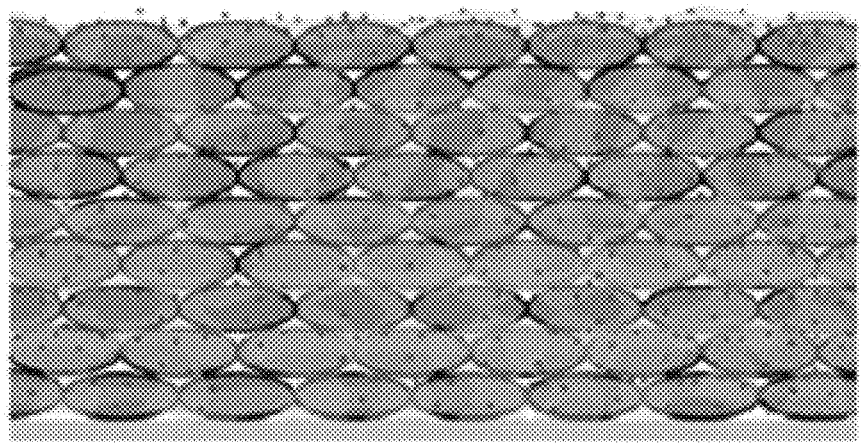
Figure 1A:
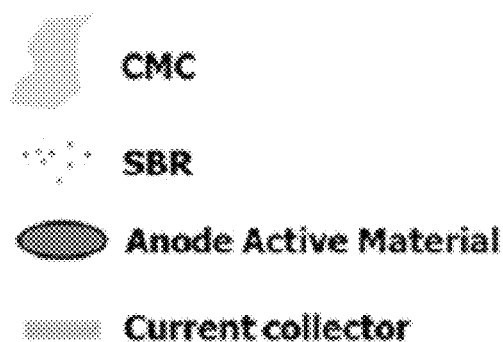

Advantages and features of the present invention and methods accomplishing them will become apparent from the following detailed description of embodiments with reference to the accompanying drawings. However, the present invention is not limited to embodiments to be described below, but may be implemented in various different forms, these embodiments will be provided only in order to make the present invention complete and allow one of ordinary skill in the art to which the present invention pertains to completely recognize the scope of the present invention, and the present invention will be defined by the scope of the claims. Hereinafter, detailed contents for carrying out the present invention will be described in detail with reference to the accompanying drawings. Throughout the drawings, the same reference numbers denote the same components, and "and/or" includes each and all of one or more combinations of the mentioned items.

Unless defined otherwise, all terms (including technical and scientific terms) used in the present specification have the same meaning as meanings commonly understood by those skilled in the art to which the present invention pertains. Throughout the present specification, unless described to the contrary, "including" any component will be understood to imply the inclusion of other elements rather than the exclusion of other elements. In addition, a singular form includes a plural form unless specially described in the text.

In the present specification, when an element such as a layer, a film, a region, or a plate is referred to as being "on" another element, it may be directly on another element or may be on another element with the other element interposed therebetween.

The present invention provides a fabrication method of an electrode for a secondary battery, including: (a) coating an electrode slurry containing an electrode active material and a binder on a current collector; (b) drying the current collector on which the electrode slurry is coated to form an electrode active material layer; and (c) surface-treating the electrode active material layer formed on the current collector to remove a binder layer on a surface of the electrode active material layer.

(a1) First, the electrode slurry containing the electrode active material, the binder, and a solvent is prepared. In this case, a content of a solid (the electrode active material and the binder) in the electrode slurry excluding the solvent may be 50 wt % or more, specifically 50 to 65 wt % based on the electrode slurry.

Specifically, a weight ratio (content ratio) of the electrode active material: the binder in the solid may be 1:0.01 to 0.1, specifically 1:0.01 to 0.08, and more specifically 1:0.02 to 0.05.

The electrode active material is not particularly limited as long as it is an electrode active material usually used for the secondary battery. A negative electrode active material may be, for example, a carbon-based negative electrode active material, a silicon-based negative electrode active material, or a mixture thereof, but is not limited thereto. The carbon-based negative electrode active material may be one or more selected among artificial graphite, natural graphite, and hard carbon. The silicon-based negative electrode active material may be Si, $SiO_x$ (0<x<2), a Si-Q alloy (here, Q is an element selected from the group consisting of alkali metals, alkaline earth metals, Group XIII elements, Group XIV elements, Group XV elements, Group XVI elements, transition metals, rare earth elements, and combinations thereof and is not Si), a Si-carbon composite, or a mixture of at least one of them and $SiO_2$. A positive electrode active material may be a composite oxide of a metal selected from cobalt, manganese, nickel, and combinations thereof and lithium, but is not limited thereto.

The binder is not particularly limited as long as it is a conventional binder capable of serving to bind the electrode active material to the current collector well while binding electrode active material particles to each other well. As an example, the binder may be a water-soluble binder, specifically, styrene-butadiene rubber, acrylated styrene-butadiene rubber, polyvinyl alcohol, sodium polyacrylate, a copolymer of propylene and olefin having 2 to 8 carbon atoms, a copolymer of (meth)acrylic acid and (meth)acrylic acid alkyl ester, or combinations thereof.

In a case where the water-soluble binder is used, the water-soluble binder may bind the electrode active material to the current collector well without affecting a viscosity of a slurry, but since the slurry may easily gel due to the electrode active material and a conductive agent, which are fine particles, a thickener for making the slurry stable by imparting a viscosity to the slurry may be further included. As an example, the thickener may be a mixture of one or more of cellulose-based compounds, specifically, carboxymethyl cellulose, hydroxypropylmethyl cellulose, methyl cellulose, or alkali metal salts thereof. As an alkali metal, Na, K, or Li may be used.

The solvent is not particularly limited as long as it is a solvent usually used for the electrode slurry. Specifically, a solvent for a negative electrode may be at least one selected from the group consisting of water, pure water, deionized water, distilled water, ethanol, isopropanol, methanol, acetone, n-propanol and t-butanol, but is not limited thereto. A solvent for a negative electrode may be at least one selected from the group consisting of an amine-based solvent such as N,N-dimethylaminopropylamine and diethyltriamine; an ether-based solvent such as ethylene oxide and tetrahydrofuran; a ketone-based solvent such as methyl ethyl ketone; an ester-based solvent such as methyl acetate; and a polar aprotic solvent such as dimethylacetamide and N-methyl-2-pyrrolidone, but is not limited thereto.

The electrode slurry may further include a conductive agent in order to impart conductivity to the electrode. In this case, the conductive agent is not particularly limited as long as it is a conventional electrically conductive material that does not cause a chemical change in the secondary battery. As an example, the conductive agent may be natural graphite, artificial graphite, carbon black, acetylene black, ketjen black, carbon fiber, carbon nanotube, and combinations thereof, but is not limited thereto.

(a2) Then, the prepared electrode slurry is coated on the current collector. As a non-restrictive example, the coating may be performed using any coating method known to be used for forming a film by generally coating a liquid phase. For example, the coating may be performed using spray coating, dip coating, spin coating, gravure coating, slot die coating, doctor blade coating, roll coating, inkjet printing, flexography printing, screen printing, electrohydrodynamic inkjet printing, micro contact printing, imprinting, reverse offset printing, bar-coating, gravure offset printing, and the like, but is not limited thereto.

The current collector may be one selected from the group consisting of copper foil, nickel foil, stainless steel foil, titanium foil, nickel foam, copper foam, a polymer substrate coated with a conductive metal, and combinations thereof, but is not limited thereto.

(b) The electrode active material layer is formed by drying the current collector on which the electrode slurry is coated. The drying may be performed at 60 to 300° C., preferably at 80 to 250° C., for 0.5 to 2 hours. In this case, the current collector coated with the electrode slurry may increase an adhesion between the electrode active material in the electrode slurry and the current collector through a rolling process after a drying step. Specifically, the rolling process may be performed by passing the current collector coated with a negative electrode slurry between two or more rolls that rotate, but is not limited thereto.

(c) The electrode active material layer formed on the current collector is surface-treated. In this case, the surface treatment is dry surface treatment, is to remove the binder on the surface of the already dried electrode active material layer, and may be continuously applied to and performed on a process line for fabricating the electrode.

Generally, the binder layer is formed on the surface of the electrode active material layer formed on the current collector through a drying (or drying and rolling) process of the electrode slurry, as illustrated in FIG. 1A. The binder in the electrode active material layer serves to bind the electrode active material and the electrode active material or the electrode active material and the conductive agent to each other and adhere the electrode active material layer and the current collector to each other, and the binder layer formed on the surface of the electrode active material layer is substantially irrelevant to the above-described binding or adhering, but rather acts as a resistor on the surface of the electrode active material layer. In particular, a resistance is increased by the resistor under a quick charging condition, such that quick charging performance is deteriorated, and lithium dendrite is formed, such that lifespan characteristics are deteriorated.

Meanwhile, the binder layer on the surface of the electrode active material layer may be removed through generation of free radicals by plasma treatment. However, the plasma treatment may cause a problem that the binder and the active material inside the electrode active material layer are damaged due to a sputtering effect by kinetic energy of plasma ions as well as the free radicals. That is, in the surface treatment by a plasma treatment method, it is difficult to selectively remove the binder of the outermost layer of the electrode active material layer, and the binder existing in the electrode active material layer is removed, such that an adhesion between the electrode active material layer and the current collector is decreased, and thus, the electrode active material layer may be peeled off from the current collector.

Figure 1B:
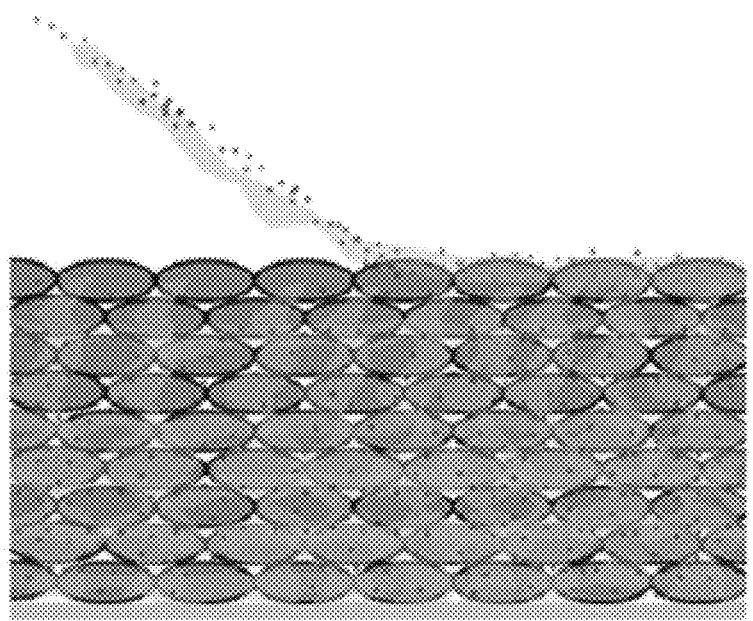
Figure 1B:
Figure 1B:
Figure 1B:
Figure 1B:
Figure 1C:
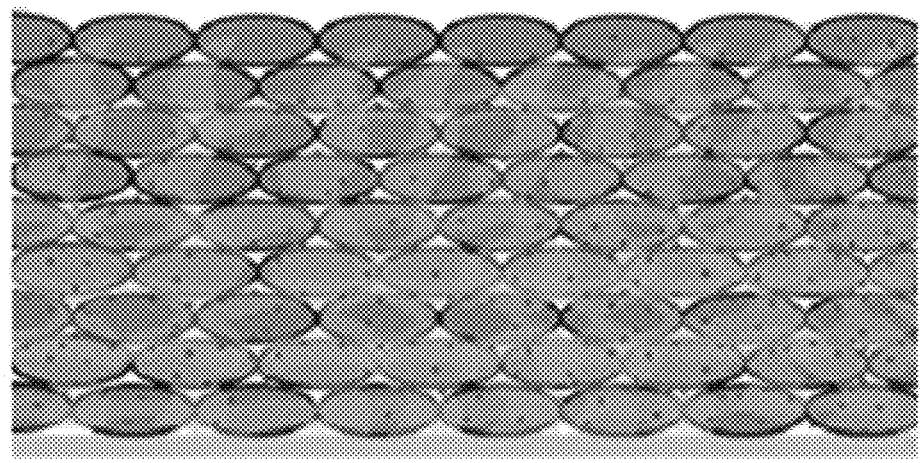
Figure 1C:
Figure 1C:
Figure 1C:
Figure 1C:

On the other hand, in the present invention, as illustrated in FIGS. 1B and 1C, the binder layer on the surface of the electrode active material layer may be selectively removed through ultraviolet (UV)-ozone treatment of the electrode active material layer, such that a decrease in adhesion between the electrode active material layer and the current collection may be suppressed. In this case, a thickness of the binder layer to be removed may be 1 to 50 nm, preferably 1 to 20 nm, and more preferably 3 to 10 nm. A thickness range of the binder layer to be removed on the surface of the electrode active material layer satisfies the above range, such that it is possible to effectively remove the binder serving as a resistor on the surface of the electrode active material layer while maintaining a content of an effective binder playing a binding role inside the electrode active material layer.

The UV-ozone treatment may be performed by irradiating the electrode active material layer with ultraviolet light. In this case, the ultraviolet light may include two wavelengths near 185 nm and 254 nm, and the binder existing on the surface of the electrode active material layer may be oxidized and removed by the irradiated ultraviolet energy and ozone generated by the irradiated ultraviolet light. Specifically, an energy intensity for the irradiated wavelength of 185 nm is 154.7 kcal/mol, which is close to twice the energy of 84.3 kcal/mol, which is CC bond energy in the binder, such that most of the CC bonds in the binder are broken to oxidize the binder to $CO_2$ or moisture.

In terms of satisfying the above-described thickness range of the binder layer to be removed on the surface of the electrode active material layer, the UV-ozone treatment may be performed for 5 minutes to 60 minutes, preferably 10 minutes to 50 minutes, and more preferably 10 minutes to 40 minutes.

After the surface treatment of the step (c), the binder layer may be substantially removed, and non-restrictively, 60% or more, preferably 70 to 99% of the content of the binder in the binder layer before the surface treatment may be removed. Meanwhile, a total content of the binder in the electrode active material layer may be maintained at 97 wt % or more, preferably 98 wt % or more of the content of the binder before the surface treatment, such that an adhesion of the electrode active material layer to the current collector may be 0.2 N/cm or more, specifically 0.2 to 1.5 N/cm.

The present disclosure also provide an electrode for a secondary battery, including: a current collector; and an electrode active material layer positioned on at least one surface of the current collector and containing an electrode active material and a binder, wherein a content of the binder in a surface portion of the electrode active material layer is 0 to 1 wt % based on a total content of the binder in the electrode active material layer. In this case, the surface portion refers to a portion corresponding to a thickness of 50 nm from a surface of the electrode toward the current collector, and a total content of the binder in the electrode active material layer with respect to a total weight of the electrode active material layer may be 1 to 10 wt %, preferably 2 to 5 wt %.

Generally, in the electrode for a secondary battery, in a drying (or drying and rolling) step, because of a migration phenomenon in which a concentration of the binder increases due to the movement of the binder to the surface of the electrode active material layer by a flow of a low-viscosity solvent, a problem that a resistance of the fabricated electrode increases occurs. Particularly, the formation of lithium dendrite is generated due to an increase in resistance under a quick charging condition, which eventually significantly decreases lifespan characteristics.

However, the electrode for a secondary battery according to the present invention has a binder content distribution in which the content of the binder in the surface portion of the electrode active material layer is 0 to 1 wt % based on the total content of the binder in the electrode active material layer, such that the problem described above may be solved, and the adhesion of the electrode active material layer to the current collector may be 0.2 N/cm or more, specifically 0.2 to 1.5 N/cm.

In addition, the present invention provides a secondary battery including the electrode described above; a separator; and an electrolyte.

The electrode may be a positive electrode or a negative electrode depending on a type of the electrode active material contained in the electrode active material layer. The electrode active material is not particularly limited as long as it is an electrode active material usually used for the secondary battery. A negative electrode active material may be, for example, a carbon-based negative electrode active material, a silicon-based negative electrode active material, or a mixture thereof, but is not limited thereto. The carbon-based negative electrode active material may be one or more selected among artificial graphite, natural graphite, and hard carbon. The silicon-based negative electrode active material may be Si, $SiO_x$ ($0<x<2$), a Si-Q alloy (here, Q is an element selected from the group consisting of alkali metals, alkaline earth metals, Group XIII elements, Group XIV elements, Group XV elements, Group XVI elements, transition metals, rare earth elements, and combinations thereof and is not Si), a Si-carbon composite, or a mixture of at least one of them and $SiO_2$. A positive electrode active material may be a composite oxide of a metal selected from cobalt, manganese, nickel, and combinations thereof and lithium, but is not limited thereto.

The separator is not particularly limited as long as it is a separator known in the art. For example, the separator may be selected among glass fiber, polyester, polyethylene, polypropylene, polytetrafluoroethylene, or combinations thereof, may be in the form of a non-woven fabric or a woven fabric, and may optionally be used in a single-layer or multi-layer structure.

The electrolyte includes a non-aqueous organic solvent and an electrolytic salt. The non-aqueous organic solvent may be ethylene carbonate (EC), propylene carbonate (PC), dimethyl carbonate (DMC), diethyl carbonate (DEC), ethylmethyl carbonate (EMC), 1,2-dimethoxyethane (DME), γ-butyrolactone (BL), tetrahydrofuran (THF), 1,3-dioxolane (DOL), diethyl ester (DEE), methyl formate (MF), methyl propionate (MP), sulfolane (S), dimethyl sulfoxide (DMSO), acetonitrile (AN), or a mixture thereof, but is not limited thereto. The electrolytic salt is a material dissolved in the non-aqueous organic solvent, acting as a supply source of electrolytic metal ions in the secondary battery to enable a basic operation of the secondary battery, and promoting movement of the electrolytic metal ions between the positive electrode and the negative electrode. As a non-restrictive example, in a case where an electrolytic metal is lithium, the electrolytic salt may be $LiPF_6$, $LiBF_4$, LiTFSI, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (here, x and y are natural numbers), LiCl, LiI, or a mixture thereof, but is not limited thereto. In addition, the electrolyte salt may be a known material used in a concentration suitable for the purpose, and may further, if necessary, include a known solvent or additive in order to improve charging/discharging characteristics, flame-retardant characteristics, and the like.

EXAMPLE

Example 1

Step 1: Preparation of Negative Electrode Slurry

Water was added to 97.7 wt % of artificial graphite, 1.5 wt % of a styrene-butadiene rubber (SBR) binder, and 1.2 wt % of carboxymethyl cellulose (CMC), and mixing was then performed to prepare a negative electrode slurry in which a content of a solid is 55 wt %.

Step 2: Fabrication of Negative Electrode

The negative electrode slurry prepared in Step 1 was coated on one surface of a copper current collector (copper foil having a thickness of 8 μm) using a coater, and then dried in a drying furnace heated with hot air of 120° C. for 1 minute. Next, a negative electrode having a final thickness of 76 μm and a mixture density of 1.67 g/cc was fabricated through a rolling process.

Step 3: Surface Treatment of Negative Electrode

Surface treatment was performed by performing UV-ozone treatment under the following conditions toward a negative electrode active material layer of the negative electrode fabricated in Step 2.

UV-ozone lamp wavelength: 184.9 nm and 254 nm (PSDP-UVT available from Novascan Technologies, Inc.)
Treatment time: 20 minutes
Condition: 100° C. and atmospheric pressure Step 4: Fabrication of Half-Cell A polyethylene (PE) separator was interposed between the fabricated negative electrode and a counter electrode made of a lithium metal, and an electrolyte was then injected to fabricate a CR2016 coin cell. A half-cell was fabricated by halting the assembled coin cell at room temperature for 12 hours or more. In this case, as the electrolyte, a resultant obtained by mixing an electrolyte additive (FEC 2 vol %) with a mixture of a lithium salt (1.0 M $LiPF_6$) and an organic solvent (ethylene carbonate (EC)/ethylmethyl carbonate (EMC)/diethylene carbonate (DEC) (25/45/30: volume ratio) was used.

Step 5: Fabrication of Full Cell

A negative electrode was fabricated in the same manner in Step 2 except that the negative electrode slurry was coated on both surfaces of the current collector instead of one surface of the current collector and then dried and rolled to fabricate a negative electrode having a final thickness of 168 μm, and surface treatment was performed on the negative electrode.

A positive electrode slurry prepared by mixing a positive electrode active material ($Li_{1.0}Ni_{0.6}Co_{0.2}Mn_{0.2}O_2$), a conductive agent (Denka Black), a binder (polyvinylidene fluoride (PVDF)), and a solvent (N-methyl pyrrolidone) with each other in a weight ratio of 46:2.5:1.5:50 was coated, dried, and pressed on an aluminum substrate to fabricate a positive electrode.

The fabricated positive electrode and negative electrode were notched at a predetermined size and were stacked, a separator (made of polyethylene and having thickness of 25 μm) was interposed between the positive electrode and the negative electrode to configure a battery, and tab portions of the positive electrode and the negative electrode were welded.

The welded positive electrode/separator/negative electrode assembly was put in a pouch, tap portions was included in a sealing region, and three surfaces of the positive electrode/separator/negative electrode assembly except for an electrolyte injection surface were sealed. An electrolyte was injected into the positive electrode/separator/negative electrode assembly through the electrolyte injection surface, the electrolyte injection surface was sealed, and impregnation was then performed for 12 hours. As the electrolyte, a resultant obtained by preparing a 1 M $LiPF_6$ solution as a mixed solvent of ethylene carbonate (EC)/ethylmethyl carbonate (EMC)/diethylene carbonate (DEC) (25/45/30: volume ratio) and then adding an electrolyte additive (FEC) to the 1 M $LiPF_6$ solution in 2 vol % was used.

Thereafter, pre-charging was performed for 36 minutes at a current (2.5 A) corresponding to 0.25 C. After 1 hour, degassing was performed, aging was performed for 24 hours or more, and formation charging and discharging were then performed (charging condition: CC-CV 0.2 C 4.2 V 0.05 C CUT-OFF and discharging condition: CC 0.2 C 2.5 V CUT-OFF).

Thereafter, standard charging and discharging were performed (charging condition: CC-CV 0.5 C 4.2 V 0.05 C CUT-OFF and discharging condition: CC 0.5 C 2.5 V CUT-OFF).

Evaluation Example

Evaluation Example 1: Evaluation of Adhesion Between Negative Electrode Active Material Layer and Current Collector Examples 2 to 4

The same processes as in Example 1 were performed except that a UV-ozone treatment time was changed to times shown in the following Table 1 instead of 15 minutes in Step 3 of Example 1.

Comparative Example

The same processes as in Example 1 were performed except that Step 3 of Example 1 was not performed.
(Evaluation Method)

Each of the negative electrodes fabricated in Examples 1 to 4 and Comparative Example was cut at a width of 18 mm and a length of 150 mm, and a tape having a width of 18 mm was attached to a foil layer of the negative electrode and then allowed to be sufficiently adhered to the foil layer with a roller having a load of 2 kg. The negative electrode active material layer was attached to one side of a tensile tester using a double-sided tape. The tape attached to the foil layer was fastened to the other side of the tensile tester, measurement of an adhesion was performed, and measurement results were shown in Table 1.

TABLE 1

| | UV-ozone treatment time (minute) | Adhesion (N/cm) |
|---|---|---|
| Example 1 | 15 | 0.34 |
| Example 2 | 30 | 0.32 |
| Example 3 | 120 | 0.2 |
| Example 4 | 5 | 0.35 |
| Comparative Example | — | 0.35 |

It can be seen in Table 1 that in a case where a UV-ozone treatment time is less than 120 minutes, an adhesion was similar to that of Comparative Example in which surface treatment is not performed. On the other hand, in a case of Example 3 in which UV-ozone treatment time is 120 minutes, it is decided that a binder inside a negative electrode active material layer in a thickness direction from a surface of the negative electrode active material layer as well as on the surface of the negative electrode active material layer was removed to show a relative low adhesion.

Therefore, it can be seen that a preferable UV-ozone treatment time is less than 120 minutes.

Evaluation Example 2: Evaluation of Initial Charging and Discharging Efficiency and Charging Capacity Retention Rate According to Quick Charging A stabilizing step was performed by performing initial charging and discharging for five cycles under 0.1 C charging (5 mV 0.01 C cut off)/0.1 C discharging (1.5 V cut off) conditions using the half-cells prepared in Examples 1 to 4 and Comparative Example. In this case, initial efficiencies (%) were calculated by a calculation method of charging capacity/discharging capacity*100 based on a charging capacity and a discharging capacity measured in a first cycle, and were shown in Table 2.

Additional charging and discharging processes were performed for 4 cycles under the initial charging and discharging conditions, and charging and discharging were performed for 10 cycles under 2.0 C charging (5 mV cut off)/0.1 C discharging (1.5 V cut off) conditions. Next, charging capacity retention rates (%) obtained by calculating a percentage of a charging capacity of a tenth cycle to the charging capacity of the first cycle were shown in Table 2.

TABLE 2

| | UV-ozone treatment time (minute) | Initial efficiency (%) | Charging capacity retention rate (%) |
|---|---|---|---|
| Example 1 | 15 | 93.6 | 89.5 |
| Example 2 | 30 | 93.5 | 91.4 |
| Example 3 | 120 | 93.2 | 80.8 |
| Example 4 | 5 | 93.6 | 70.6 |
| Comparative Example | — | 93.6 | 67.7 |

Referring to Table 2, all of Examples 1 to 4 in which UV-ozone treatment was performed showed initial efficiencies similar to that of Comparative Example in which surface treatment was not performed, but showed charging capacity retention rates higher than that of Comparative Example. That is, it is decided that an influence of the binder layer existing on the surface of the negative electrode active material layer was relatively small under a low-rate charging condition, but was severe under a high-rate charging condition to show a difference between the charging capacity retention rates.

Specifically, it is decided that in a case of Examples in which the binder layer on the surface of the negative electrode active material layer was removed through the UV-ozone treatment, performance is excellent even under a high-rate charging condition due to a decrease in resistance, while but in a case of Comparative Example in which the binder layer was not removed, a lithium precipitation phenomenon due to an increase in resistance in a high-rate charging process became serious, such that a charging capacity was significantly decreased.

Meanwhile, it can be seen that in terms of a charging capacity retention rate under a high-rate charging condition, a preferable UV-ozone treatment time is more than 5 minutes and less than 120 minutes.

Evaluation Example 3: Evaluation of DC-IR and Capacity Retention Rate

Formation charging and discharging and standard charging and discharging were performed using the full cells fabricated in Examples 1 to 4 and Comparative Example, discharging direct current internal resistances (DC-IR) were then measured.

Specifically, the full cells were charged to 50% of a state of charge (SOC) at room temperature with 0.5 C, and then halted for 30 minutes. Voltages at this time were measured and set to V0, the full cells were discharged at a current of 1 C (Idis) for 10 seconds, voltages were then measured and set to V1, the discharge DC-IRs were calculated by a calculation method (V0-V1)/Idis, and calculation results were shown in Table 3.

Charging and discharging were performed for 200 cycles under charging (CC/CV 0.5 C 4.3 V 0.05 C cut off) and discharging (CC 1.0 C 3.0 V cut off) conditions using the full cells fabricated in Examples 1 to 4 and Comparative Example, and capacity retention rates (%) obtained by calculating a percentage of a discharging capacity of two-hundredth cycle to a discharging capacity of a first cycle were shown in Table 3.

TABLE 3

|  | UV-ozone treatment time (minute) | DC-IR (mΩ) | Capacity retention rate (%) |
| --- | --- | --- | --- |
| Example 1 | 15 | 3.64 | 96.4 |
| Example 2 | 30 | 3.49 | 97.2 |
| Example 3 | 120 | 3.47 | 95.3 |
| Example 4 | 5 | 4.06 | 92.9 |
| Comparative Example | — | 4.19 | 91.8 |

Referring to Table 3, Examples 1 to 4 in which the UV-ozone treatment was performed showed resistance values and capacity retention rates lower than those of Comparative Example in which the surface treatment was not performed. It is decided that Comparative Example showed a high resistance due to the presence of the binder layer on the surface of the negative electrode active material layer, and thus, an increase in resistance due to a lithium precipitation phenomenon in charging and discharging processes became more serious, such that a capacity retention rate was decreased.

On the other hand, Example 3 in which the UV-ozone treatment time was 120 minutes showed a capacity retention rate relatively lower than those of Examples 1 and 2. It is decided that when the UV-ozone treatment time is excessively long, the binder inside the negative electrode active material layer may not withstand a volume expansion of the active material repeated depending on the number of times of charging and discharging due to deterioration caused by photoaging, such that a new active material interface appeared, and a resistance was increased, such that a charging capacity was relatively decreased.

On the other hand, it is decided that in a case of Example 4 in which the UV-ozone treatment time was 5 minutes, the binder layer on the surface of the negative electrode active material layer was not sufficiently removed, such that a remarkable effect did not exhibit a significant effect.

Therefore, it can be seen that a preferable UV-ozone treatment time is more than 5 minutes and less than 120 minutes in terms of improving all of the adhesion between the negative electrode active material layer and the current collector, the charging capacity retention rate under a quick charging condition, and the lifespan characteristics.

Evaluation Example 4: Analysis of Image of Cross Section of Negative Electrode Captured by Scanning Electron Microscope (SEM)

Figure 2A:
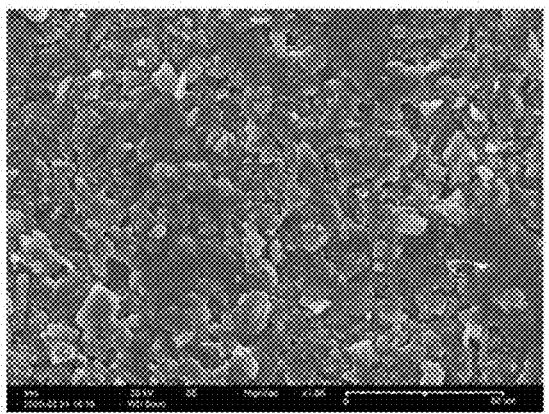
Figure 2B:
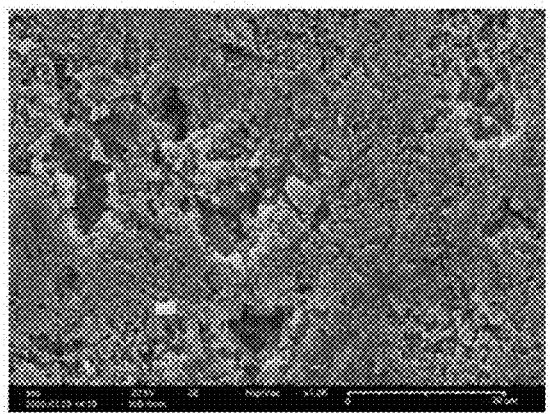

The negative electrodes obtained by disassembling the half-cells according to Example 2 and Comparative Example whose charging retention rates were evaluated according to Evaluation Example 2 were observed using a scanning electron microscope, and observation results were illustrated in FIGS. 2A to 3B. Specifically, FIGS. 2A and 2B illustrate surfaces of the negative electrodes, FIGS. 3A and 3B illustrate cross sections of the negative electrodes, wherein FIGS. 2A and 3A illustrate results for Example 2, and FIGS. 2B and 3B illustrate results for Comparative Example.

Specifically, FIGS. 2A and 3A are images of the surface and the cross section of the negative electrode according to Example 2, and it can be seen in FIGS. 2A and 3A that the formation of lithium dendrite on the surface of the negative electrode was significantly suppressed as compared with Comparative Example (FIGS. 2B and 3B) in which the UV-ozone treatment was not performed. That is, the negative electrode on which the surface treatment is performed according to an embodiment of the present invention exhibited a result in which the formation of the lithium dendrite on the surface of the negative electrode was significantly decreased, even after charged and discharged for a long time under the quick charging condition. Such a result indicates that lifespan characteristics may be improved by effectively suppressing the formation of the lithium dendrites by removing the binder layer on the surface of the negative electrode active material layer.

With the fabrication method of an electrode for a secondary battery according to the present invention, the electrode for a secondary battery having an excellent adhesion between the current collector and the electrode active material layer may be provided.

In addition, the binder existing on the surface of the electrode active material layer may be selectively removed to improve conductivity of the electrode, and a problem such as the increase in resistance and growth of the lithium dendrite may be prevented to improve performance under the quick charging condition and lifespan characteristics.

What is claimed is:

1. A fabrication method of an electrode for a secondary battery, comprising the steps of:
    (a) coating an electrode slurry containing an electrode active material and a binder on a current collector;
    (b) drying the current collector on which the electrode slurry is coated to form an electrode active material layer; and
    (c) surface-treating the electrode active material layer formed on the current collector to remove the binder from a surface of the electrode active material layer to form a surface layer from which the binder has been removed, wherein a thickness of the surface layer is 1 to 50 nm.

2. The fabrication method of an electrode for a secondary battery of claim 1, wherein the surface treatment is dry surface treatment.

3. The fabrication method of an electrode for a secondary battery of claim 2, wherein the surface treatment is performed by ultraviolet (UV)-ozone treatment.

4. The fabrication method of an electrode for a secondary battery of claim 3, wherein the UV-ozone treatment is performed for 5 minutes to 60 minutes.

5. The fabrication method of an electrode for a secondary battery of claim 1, wherein a content of the binder in the electrode active material layer after the surface treatment of step (c) is 97 wt % or more and less than 100 wt % of a content of the binder in the electrode active material layer before the surface treatment.

6. The fabrication method of an electrode for a secondary battery of claim 1, wherein an adhesion of the electrode active material layer to the current collector is 0.2 N/cm or more.

7. A fabrication method of an electrode for a secondary battery, comprising the steps of:
- (a) coating an electrode slurry containing an electrode active material and a binder on a current collector;
- (b) drying the current collector on which the electrode slurry is coated to form an electrode active material layer; and
- (c) surface-treating the electrode active material layer formed on the current collector to remove the binder from a surface of the electrode active material layer to form a surface layer from which the binder has been removed, wherein a content of the binder in the electrode active material layer after the surface treatment of step (c) is 97 wt % or more and less than 100 wt % of a content of the binder in the electrode active material layer before the surface treatment.

8. The fabrication method of an electrode for a secondary battery of claim 7, wherein the surface treatment is performed by ultraviolet (UV)-ozone treatment.

\* \* \* \* \*